United States Patent [19]

Kanegae et al.

[11] Patent Number: 4,839,811

[45] Date of Patent: Jun. 13, 1989

[54] AUTOMOTIVE VEHICLE TROUBLE CHECKING APPARATUS

[75] Inventors: Hidetoshi Kanegae, Tokyo; Minoru Tomikashi; Akira Hino, both of Kanagawa, all of Japan

[73] Assignee: Nissan Motor Company Limited, Yokohama, Japan

[21] Appl. No.: 98,868

[22] Filed: Sep. 21, 1987

[30] Foreign Application Priority Data

Sep. 22, 1986 [JP] Japan ............................... 61-222150

[51] Int. Cl.[4] ............................................... G06F 15/20

[52] U.S. Cl. .......................... 364/424.03; 364/431.01; 73/116

[58] Field of Search ...................... 364/424.03, 551.01, 364/431.01; 340/52 F; 73/116, 117.3

[56] References Cited

U.S. PATENT DOCUMENTS

| | | | |
|---|---|---|---|
| 3,882,305 | 5/1975 | Johnstone | 364/551 |
| 4,188,618 | 2/1980 | Weisbart | 340/52 F |
| 4,258,421 | 3/1981 | Juhasz et al. | 340/52 F |
| 4,267,569 | 5/1981 | Baumann et al. | 364/431.01 |
| 4,270,174 | 5/1981 | Karlin et al. | 364/551 |
| 4,623,974 | 11/1986 | Denz et al. | 73/117.3 |
| 4,694,408 | 9/1987 | Zaleski | 364/551 |

FOREIGN PATENT DOCUMENTS

| | | |
|---|---|---|
| 55-162069 | 12/1980 | Japan . |
| 56-47805 | 4/1981 | Japan . |

*Primary Examiner*—Gary Chin

*Attorney, Agent, or Firm*—Foley & Lardner, Schwartz, Jeffery, Schwaab Mack, Blumenthal & Evans

[57] ABSTRACT

A trouble checking apparatus for use with an automotive vehicle having sensors sensitive to a condition of the automotive vehicle for producing sensor signals indicative of parameters reflective of the sensed condition. The apparatus includes a control circuit responsive to the sensor signals for calculating a value corresponding to a setting of each of a plurality of means for controlling the automotive vehicle. A self-checking unit is connected to the control circuit for checking the sensor signals applied to the control circuit to provide a self-checking code indicative of a cause of automotive vehicle trouble when at least one of the sensor signals has an abnormal value. An external trouble checking unit is connected through a detachable connector to the self-checking unit for utilizing the sensor signals fed to the control circuit and the self-checking code to find a cause of automotive vehicle trouble.

3 Claims, 4 Drawing Sheets

AUTOMOTIVE VEHICLE TROUBLE CHECKING APPARATUS

BACKGROUND OF THE INVENTION

This invention relates to a trouble checking apparatus for use with an automotive vehicle.

Japanese Patent Kokai No. 56-47805 discloses a trouble checking apparatus operable in accordance with a checking program for checking engine operation in certain respects while running the engine under a specified condition. Japanese Patent Kokai No. 55-162069 discloses a trouble checking apparatus which monitors a voltage signal outputted from a sensor such as a temperature sensor and provides an alarm when the monitored voltage signal is out of a range defined by predetermined upper and lower limits. Although such conventional trouble checking apparatus are satisfactory in checking a simple trouble produced in a sensor or a line connected to the sensor, there usefulness is limited in inspecting the cause of a complex trouble.

In order to inspect the cause of a complex automotive vehicle trouble, there has been developed another type of trouble checking apparatus which can synthesize the whole situation of the automotive vehicle operation. The trouble checking apparatus of this type employs a number of sensors sensitive to various automotive vehicle operating conditions and analyzes the sensed automotive vehicle operating conditions in a predetermined sequence. However, such conventional trouble checking apparatus requires troublesome operations to set the sensors at various positions of the automotive vehicle before the trouble checking operation starts.

SUMMARY OF THE INVENTION

Therefore, it is a main object of the invention to provide a trouble checking apparatus which can estimate the cause of a complex trouble in an automotive vehicle without any requirement for troublesome operations.

There is provided, in accordance with the invention, a trouble checking apparatus for use with an automotive vehicle having a plurality of means for controlling the automotive vehicle, and sensors sensitive to a condition of the automotive vehicle for producing sensor signals indicative of parameters reflective of the sensed condition. The apparatus includes a control circuit responsive to the sensor signals for calculating a value corresponding to a setting of each of the means for controlling the automotive vehicle, the calculating being performed repetitively at uniform intervals from a, relationship between the sensed condition and each of the means for controlling the automotive vehicle. The control circuit includes means for converting the calculated value into a setting of the corresponding means for controlling the automotive vehicle. A self-checking unit is connected to the control circuit for checking the sensor signals applied to the control circuit to provide a self-checking code indicative of a cause of trouble in the automotive vehicle. An external trouble checking unit is connected through a detachable connector to the self-checking unit for utilizing the sensor signals fed to the control circuit and the self-checking code to find a cause of trouble in the automotive vehicle.

BRIEF DESCRIPTION OF THE INVENTION

The present invention will be described in greater detail by reference to the following description taken in connection with the accompanying drawings, in which.

DETAILED DESCRIPTION OF THE PREFERRED EMBODIMENTS

Figure 1:
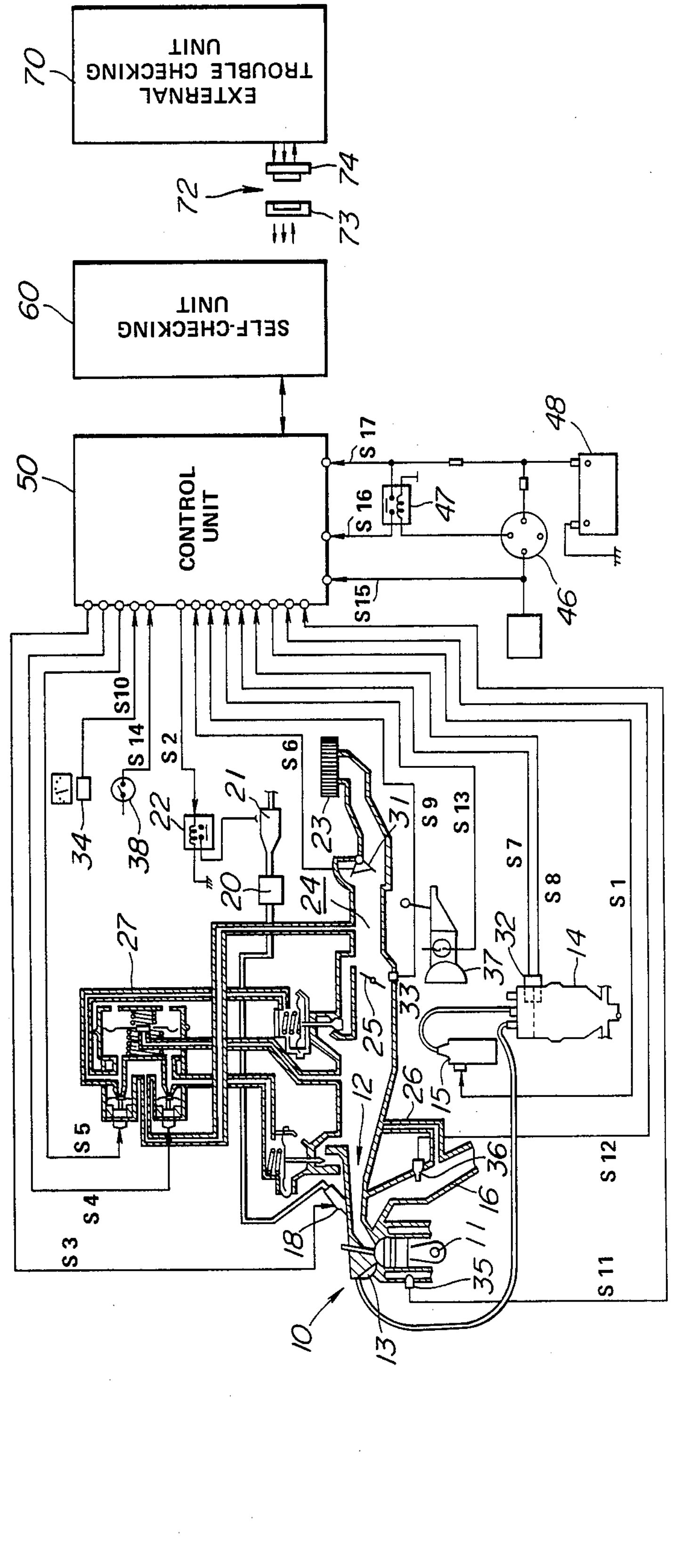
FIG. 1 is a schematic view showing one embodiment of a trouble checking apparatus made in accordance with the invention.

With reference to the drawings, and in particular to FIG. 1, there is shown a schematic diagram of an automotive vehicle trouble checking apparatus embodying the invention. An internal combustion engine, generally designated by the numeral 10, for an automotive vehicle includes a combustion chamber or cylinder within which a piston is mounted for reciprocal motion. A crankshaft 11 is supported for rotation within the engine 10 in response to reciprocation of the piston within the cylinder.

An intake manifold 12 is connected with the cylinder through an intake port with which an intake valve is in cooperation for regulating the entry of combustion ingredients into the cylinder from the intake manifold 12. A spark plug 13 is mounted in the top of the cylinder for igniting the combustion ingredients within the cylinder when the spark plug 13 is energized by the presence of high voltage electrical energy from a distributor 14 connected to an ignition coil 15. The distributor 14 has a rotor driven at one-half the rotational velocity of the crankshaft. As the distributor rotor rotates, it sequentially contacts distributor electrical contacts to permit high voltage electrical energy to be supplied at appropriate intervals to the spark plug 13. The spark timing of the ignition coil 15 is controlled by a spark timing control signal S1 fed to the ignition coil 15 from an control unit 50. An exhaust manifold 16 is connected with the cylinder through an exhaust port with which an exhaust valve is in cooperation for regulating the exit of combustion products, exhaust gases, from the cylinder into the exhaust manifold 16. The intake and exhaust valves are driven through a suitable linkage with the crankshaft 11.

A fuel injector 18 is connected through a pressure regulator 20 to a fuel pump 21 connected to a fuel tank (not shown). The fuel pump 21 is electrically operated when a relay 22 is energized by the presence of an electrical signal S2. The pressure regulator 20 maintains the fuel to the fuel injector 18 at a constant pressure. The fuel injector 18 opens to inject fuel into the intake manifold 12 when it is energized by the presence of an electrical pulse signal S3. The length of the electrical pulse, that is, the pulse-width, applied to the fuel injector 18 determines the length of time the fuel injector 18 opens and, thus, determines the amount of fuel injected into the intake manifold 12. Air to the engine 10 is supplied through an air cleaner 23 into an induction passage 24. The amount of air permitted to enter the combustion chamber through the intake manifold 12 is controlled by a butterfly throttle valve 25 suitable within the induction passage 24. The throttle valve 25 is connected by a mechanical linkage to an accelerator pedal.

In the operation of the engine 10, fuel is injected through the fuel injector 18 into the intake manifold 12 and mixed with the air therein. When the intake valve opens, the air-fuel mixture enters the combustion chamber. An upward stroke of the piston compresses the air-fuel mixture, which is then ignited by a spark produced by the spark plug 13 in the combustion chamber. Combustion of the air-fuel mixture in the combustion chamber takes place, releasing heat energy, which is converted into mechanical energy upon the power stroke of the piston. At or near the end of the power stroke, the exhaust valve opens and the exhaust gases are discharged into the exhaust manifold 16. Most of the exhaust gases are discharged to the atmosphere through an exhaust system (not shown). Some of the exhaust gases are recirculated to the combustion chamber through an exhaust gas recirculation (EGR) system including an EGR passage 26 having an EGR valve placed therein for controlling the amount of exhaust gases flowing therethrough. The numeral 27 designates a VCM valve 27 having control valves which are responsive to respective control signals S4 and S5 for controlling the amount of air introduced into the induction passage 24 through a passage bypassing the throttle valve 25.

Although the engine 10 as illustrated in FIG. 1 shows only one combustion chamber formed by a cylinder and piston, it should be understood that the engine control system described herein is designated for use on a multicylinder engine. Thus, it should be understood that there are a plurality of cylinders, and also intake valves, exhaust valves and reciprocating pistons, spark plugs, and fuel injectors related to the number of cylinders in the engine 10.

The amount of fuel metered to the engine, this being determined by the width of the electrical pulse S3 applied to the fuel injector 18, the fuel injection timing, and the ignition-system spark timing are repetitively determined from calculations performed by the control unit 50, these calculations being based upon various conditions of the engine 10 that are sensed during its operation. These sensed conditions include intake air flow, engine speed, throttle valve position, spark advance, vehicle speed, cylinder-head coolant temperature, exhaust gas oxygen concentration, transmission gear position, air conditioner switch position, and so on. Thus, an airflow meter 31, an engine speed sensor 32, an idle switch 33, a vehicle speed sensor 34, a cylinder-head coolant temperature sensor 35, an oxygen sensor 36, a neutral switch 37, and an air conditioner switch 38 are connected to the control unit 50.

The airflow meter 31 is sensitive to the amount of air introduced into the induction passage 24 and produces an electrical signal S6 indicative of the sensed air amount. The engine speed sensor 32 may comprise a crankshaft position sensor and a reference pulse generator for producing an engine rotation signal S7 having a series of crankshaft position electrical pulses, each corresponding to one degree of rotation of the engine crankshaft, of a repetition rate directly proportional to engine speed and a reference electrical pulse S8 at a predetermined number of degrees before the top dead center position of each engine piston, respectively. The idle switch 33 produces an electrical signal S9 at idle conditions where the throttle valve 25 is at or near its closed position. The vehicle speed sensor 34 is sensitive to the speed of travel of the automotive vehicle and it produces an electrical signal S10 indicative of the sensed vehicle speed. The cylinder-head coolant temperature sensor 35 is mounted in the engine cooling system and comprises a thermistor connected in an electrical circuit capable of producing a DC voltage S11 having a variable level proportional to coolant temperature. The oxygen sensor 36 monitors the oxygen content of the exhaust and provides an electrical signal S12 indicative of the air-fuel ratio at which the engine is operating. The neutral switch 37 is responsive to the position of the transmission gear in neutral for generating an electrical signal S13. The air conditioner switch 38 provides an electrical signal S14 when the air conditioner is in operation. The character S15 designates a start signal fed from an ignition key switch 46, the character S16 designates an "ON" signal fed from an ignition relay 47, and the character S17 designates a battery voltage signal indicative of the voltage of a vehicle battery 48.

The control unit 50 employs a digital computer which includes an input/output control circuit (I/O), a central processing unit (CPU), a read only memory (ROM), and a random access memory (RAM). The input/output control circuit includes a signal shaper and amplifier, an analog multiplexer, an analog-to-digital converter, a fuel injection control circuit, and a spark timing control circuit. The signal shaper and amplifier receives the engine rotation signal S7 fed thereto from the engine speed sensor 32 and its amplifies and shapes the alternating engine rotation signal. The analog multiplexer receives analog signals from the various sensors. The analog-to-digital converter converts the various inputs to the analog multiplexer, one by one, into digital form for application to the central processing unit. The A to D conversion process is initiated on command from the central processing unit which selects the input channel to be converted. The read only memory contains the program for operating the central processing unit and further contains appropriate data in look-up tables used in calculating appropriate values for fuel-injection pulse-width and ignition-system spark-timing. The look-up data may be obtained experimentally or derived empirically. Control words specifying a desired spark timing are periodically transferred by the central processing unit to the spark timing control circuit which converts it into a control signal S1 for controlling the spark timing of the ignition system. Similarly, control words specifying a desired fuel-injection pulse-width are periodically transferred by the central processing unit to the fuel injection control circuit which converts it into a control signal S3 for controlling the operation of the fuel injector 18. The random access memory stores control data including the values calculated repetitively for fuel-injection pulse-width, ignition-system spark-timing, EGR-valve position, and so on, in time sequence a along with the corresponding sensed conditions including engine-speed, intake-air-flow, vehicle-speed, cylinder-head coolant-temperature, exhaust-gas oxygen-concentration, throttle-valve position, transmission-gear position values.

The control unit 50 is connected to a trouble self-checking unit 60 installed on the automotive vehicle. The trouble self-checking unit 60 monitors the sensed conditions of reads the data stored in the random access memory of the control unit 50 in time sequence and produces a self-checking code indicative of a cause of automotive vehicle trouble when the sensed conditions or the read data have an unexpected value or a logical error. For example, if the sensed engine speed is 3,000 rpm and the sensed intake airflow has a great value in the presence of an electrical signal S9 indicating an engine idling condition, the trouble self-checking unit 60 displayed a code number on its display device to indicate that the idle switch 19 is subject to failure. The trouble self-checking unit 60 can be connected to an external trouble checking unit 70 through a detachable connector 72 having two mating pieces 73 and 74.

Referring to FIG. the external trouble checking unit 70 employs a digital computer which includes an interface circuit (INT) 81, a central processing unit (CPU) 82, a read only memory (ROM) 83, a random access memory (RAM) 84 and an input/output control circuit. The central processing unit 82 communicates with the rest of the computer via data bus. The interface circuit 81 is used to connect the external trouble checking unit 70 to the trouble self-checking unit 60 through the connector 72. The read only memory 83 contains the program for operating the central processing unit 82 and further contains appropriate data used in checking the data transferred thereto from the trouble self-checking unit 60 so as to estimate a cause of the trouble in the automotive vehicle. The random access memory 84 stores data transferred thereinto from the control circuit 50 and/or the trouble self-checking unit 60 and further stores appropriate references values used in comparisons with the transferred data. An input device 86, which may a keyboard, is used for inputting vehicle information and trouble information into the external trouble checking unit 70. The vehicle information includes vehicle's type, production number, specifications, and so on. The trouble information includes a code which indicates the kind of trouble to be checked by the external trouble checking unit 70. Sensors 87, rather than the sensors installed on the automotive vehicle, may be connected to input additional sensed engine operating conditions into the external trouble checking unit 70. The external trouble checking unit 70 is connected to a CRT display device 88 and/or a printer 89 which displays the result of the trouble checking operation of the external trouble checking unit 70 and instructions provided to the operator in the course of the trouble checking operation of the external trouble checking unit 70.

Figure 3:
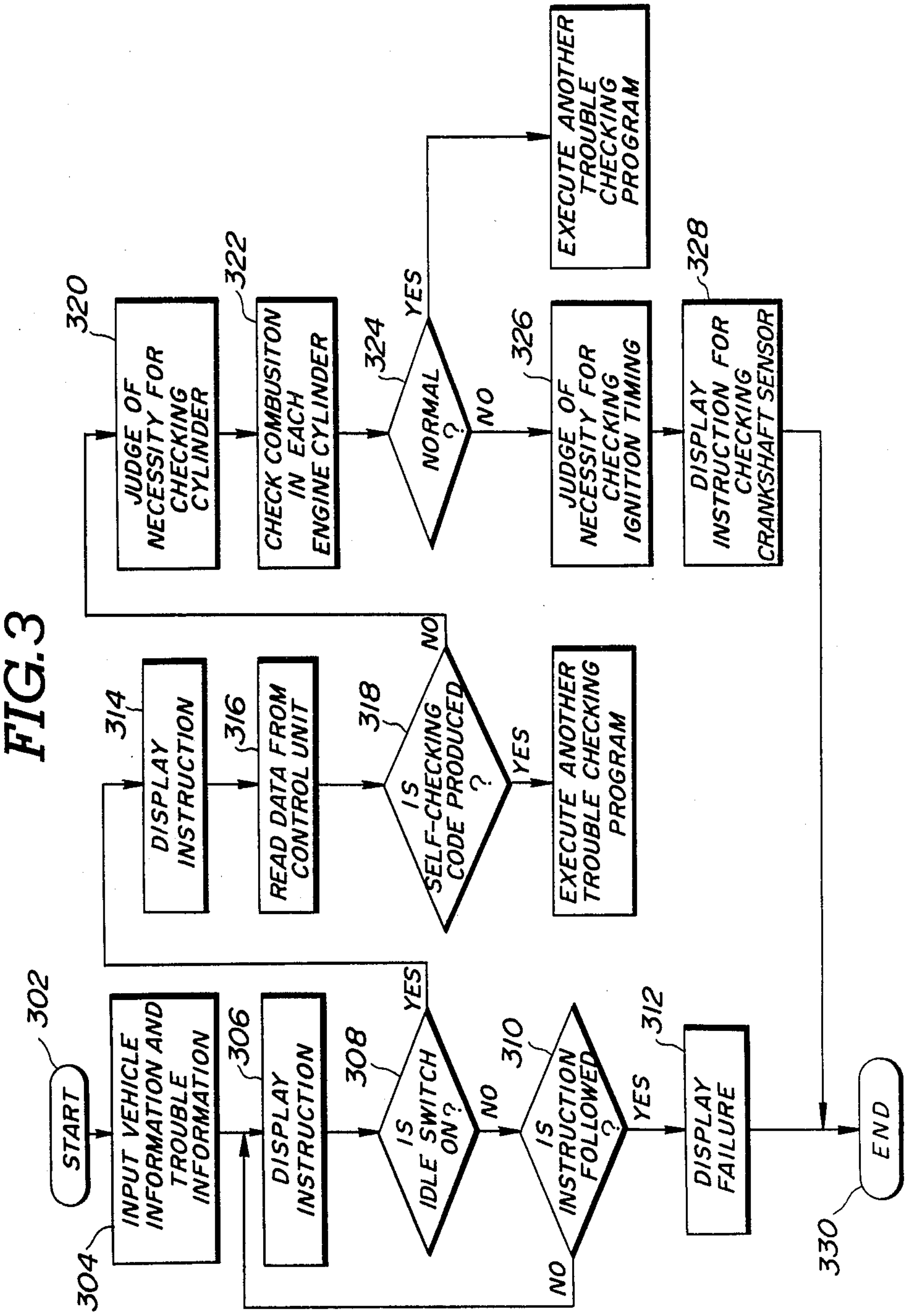
FIG. 3 is a flow diagram illustrating the programming of the digital computer used in the external trouble checking unit.

FIG. 3 is a flow diagram illustrating the programming of the digital computer used in the external trouble checking unit 70. The computer program is entered at the point 302 after connection of the connector mating pieces 73 and 74. At the point 304 in the program, the digital computer awaits the receipt of vehicle information and trouble information inputted thereto from the keyboard 86 operated by an operator such as a serviceman. The vehicle information includes vehicle's type, production number and specifications. Assuming now that the user complains of unstable engine idling conditions, the operator may operate the keyboard 86 to input a code representing the trouble.

After the receipt of the vehicle and trouble information, the program proceeds to the point 306 where an instruction is displayed on the display device 88. This instruction requires for the operator to turn on the ignition key and make repetitive operations of the accelerator pedal with the engine being held at still. At the point 308 in the program, a determination is made as to whether the idle switch is on or off. To make this determination, the digital computer monitors the signal S9 produced from the idle switch 33 (FIG. 1). This information is fed to the digital computer through the connector 72 from the control unit 50. If the answer to this question is "yes", then the program proceeds to the point 314. Otherwise, the program proceeds to the point 310.

At the point 310 in the program, a determination is made as to whether or not the operator followed the instruction. To make this determination, the digital computer displays a question as to whether the operator followed the instruction and requires for the operator to input "YES" when he followed the instruction and "NO" when he did not follow the instruction. If the answer to this question is "yes", then the program proceeds to the point 312. Otherwise, the program returns to the point 306. At the point 312, the digital computer displays the cause of the trouble to indicate that the idle switch 33 or the associated line is subject to failure. Following this, the program proceeds to the end point 330.

At the point 314 in the program, another instruction is displayed on the display device 88. This instruction requires for the operator to start the engine and hold the engine idling for three minutes. At the point 316 in the program, the digital computer reads the values stored in the random access memory of the control unit 50 during this engine condition and compares the read values with respective reference values stored in the memory 84. These read values may include engine-speed, cylinder-head coolant-temperature, and ignition-system spark-timing values.

At the point 318 in the program, a determination is made as to whether or not the trouble self-checking unit 60 has produced a self-checking code. As described previously, the trouble self-checking unit 60 has a self-checking function of estimating a trouble when the data read from the random access memory of the control unit 50 has an unexpected value or a logical error and producing a self-checking code representing the estimated trouble. If the answer to this question is "yes", then another trouble checking program is executed to find the cause of the trouble by making checks according to the self-checking code. If the answer to the question is "no", then it means that the internal trouble checking unit 60 has found no trouble and the program proceeds to the point 320.

It is assumed now that, at the point 320, the digital computer central processing unit judges of a necessity for checking the cylinder balance; that is, combustion in each of the cylinders of the engine from the results of the comparisons made at the point 316. At the point 322 in the program, the digital computer central processing unit produces a command causing the control unit 50 to stop spark ignition and/or fuel injection for each of the cylinders of the engine and monitors the engine speed obtained under this condition. It is, therefore, understood that the trouble checking apparatus of the invention can automatically make a series of cylinder combustion checkings without troublesome operations required in conventional trouble checking apparatus to pull one ignition plug cable out of the corresponding ignition plug in checking combustion in each of the cylinders of the engine. The external trouble checking unit 70 responds to an instruction inputted through the keyboard 86 operated by the operator by providing a command signal to cause the control circuit 50 to operate the automotive vehicle in accordance with the inputted operator's instruction.

At the point 324, a determination is made as to whether or not the cylinder balance is normal. To make this determination, the digital computer central processing unit compares the monitored engine speed values from one another. If the answer to this question is "yes", then another trouble checking program is executed to find the trouble. Otherwise, the program proceeds to the point 326. Assuming now that, at the point 326, the digital computer central processing unit judges of a necessity for checking ignition-system spark-timing an instruction is displayed on the display device 88. This instruction requires for the operator to measure the spark timing with a timing light and input the measured value through the keyboard. If the measured value is zero degree before top dead center in spite of the fact that the designed value is 10 degrees before top dead center, the digital computer central processing unit judges of a necessity for checking the position of the crankshaft position sensor in accordance with the data stored in the memory 84. At the point 328 in the program, an instruction is displayed on the display device 88. This instruction requires for the operator to check the crankshaft position sensor. Following this, the program proceeds to the end point 330.

Figure 2:
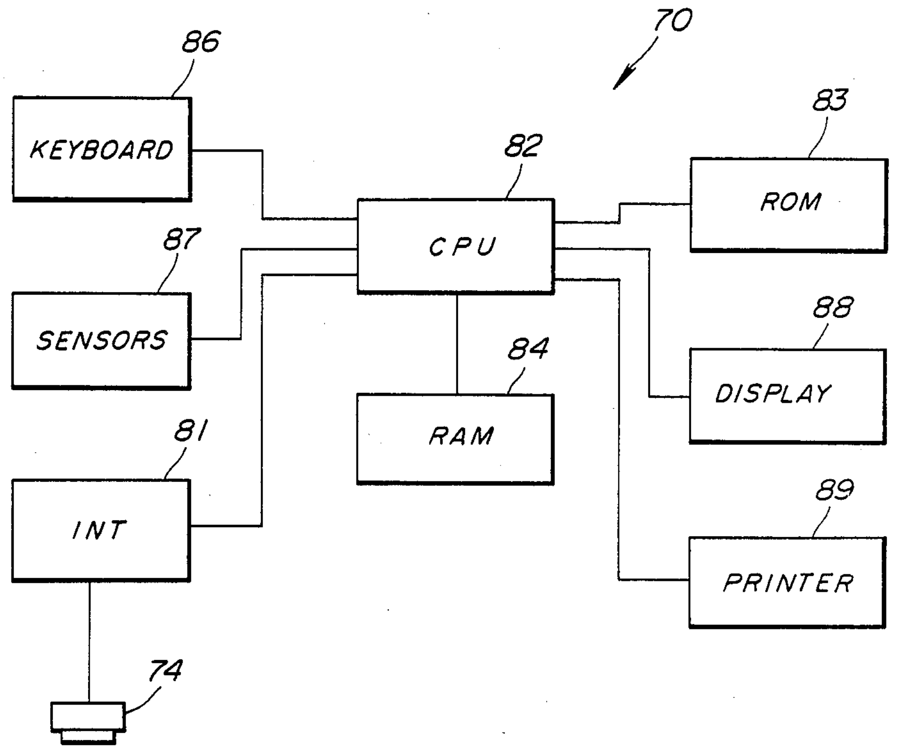
FIG. 2 is a block diagram showing the external trouble checking unit of FIG. 1.
Figure 4:
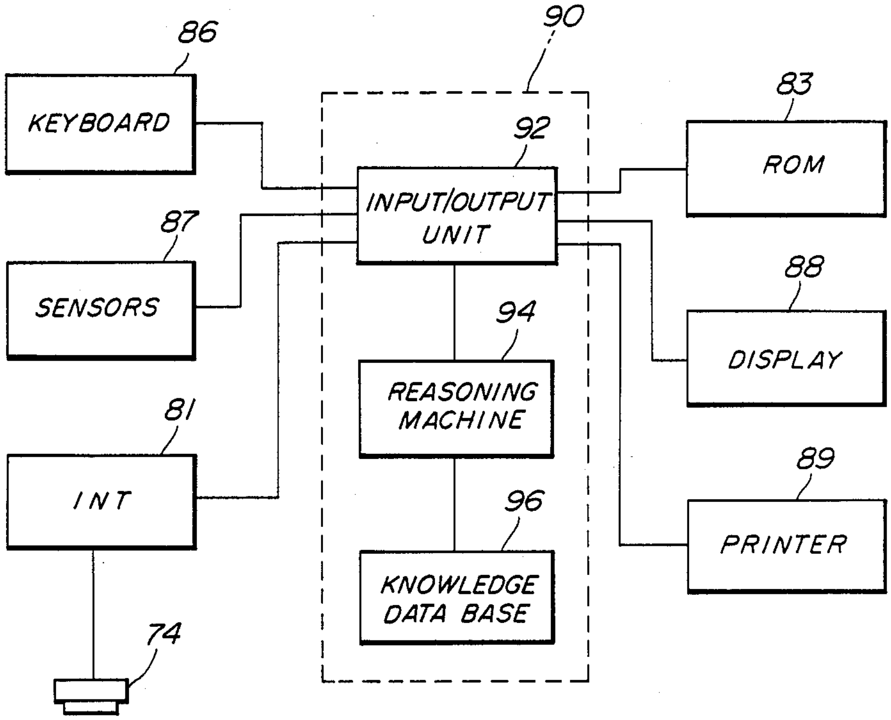
FIG. 4 is a block diagram showing a modified form of the external trouble checking unit.

Referring to FIG. 4, there is illustrated a modified form of the external trouble checking unit. The same reference numerals have been used as were used in FIG. 2 to identify the same parts. In this modification, the external trouble checking unit employs an expert system 90 including an input/output unit 92, a reasoning machine 94, and a knowledge data base 96. The input/output unit 92 is an interface for signal transmission between the expert system 90 and the other parts. The reasoning machine 94 utilizes the knowledge stored in the knowledge data base 96 to estimate the cause of the trouble inputted into the expert system 90. The knowledge data base 96 contains a number of rules each defining a cause Y in connection with a trouble X, a number of questions to be given to the operator in confirming the estimated cause Y, and other knowledges. The knowledge data base 96 provides an appropriate knowledge to the reasoning machine 94 according to an inspection made in the reasoning machine. This expert system permits fast and accurate inspection of a cause of an automotive vehicle trouble with less data and less programs as compared to the external trouble checking unit of FIG. 2.

While the invention has been described in connection with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A trouble checking apparatus for use with an automotive vehicle having a plurality of means for controlling the automotive vehicle, and sensors sensitive to conditions of the automotive vehicle for producing sensor signals indicative of parameters reflective of the sensed conditions, comprising:

a control circuit responsive to the sensor signals for calculating values corresponding to settings of the means for controlling the automotive vehicle, the calculating being performed repetitively at uniform intervals from a relationship between the sensed condition and each of the means for controlling the automotive vehicle, the control circuit including means for converting the calculated values into settings of the corresponding means for controlling the automotive vehicle;

a self-checking unit connected to the control circuit for checking the sensor signals applied to the control circuit to provide a self-checking code indicative of a cause of trouble in the automotive vehicle; and an external trouble checking unit connected through a detachable connector to the self-checking unit for utilizing the sensor signals fed to the control circuit and the self-checking code to find a cause of trouble in the automotive vehicle.

2. The trouble checking apparatus as claimed in claim 1 wherein the external trouble checking unit includes means for estimating and confirming a cause of trouble in the automotive vehicle.

3. The trouble checking apparatus as claimed in claim 1, wherein the external trouble checking unit includes means responsive to an instruction inputted thereinto by an operator for producing a command signal to cause the control circuit to operate the automotive vehicle in accordance with the inputted instruction.

* * * * *